(12) United States Patent
Kato et al.

(10) Patent No.: US 7,031,168 B2
(45) Date of Patent: Apr. 18, 2006

(54) ELECTRONIC COMPONENT AND THE METHOD OF USING IT

(75) Inventors: Shigeyuki Kato, Kyoto (JP); Takafumi Kishi, Okayama (JP); Maakazu Kido, Takamano (JP); Toshimichi Surga, Okayama (JP); Gen Yoneda, Okayama (JP); Akira Takaishi, Okayama (JP); Atsushi Mukai, Okayama (JP); Yoshihiro Nagami, Okayama (JP); Hirofumi Hosokawa, Okayama (JP)

(73) Assignee: Omron Corporation, Kyoto (JP)

( * ) Notice: Subject to any disclaimer, the term of this patent is extended or adjusted under 35 U.S.C. 154(b) by 307 days.

(21) Appl. No.: 10/438,333

(22) Filed: May 15, 2003

(65) Prior Publication Data

US 2004/0008492 A1    Jan. 15, 2004

(30) Foreign Application Priority Data

May 20, 2002  (JP) ............................. 2002-144490

(51) Int. Cl.
*H05K 1/00* (2006.01)
*H05K 1/18* (2006.01)
*H05K 1/02* (2006.01)
*H05K 1/06* (2006.01)
*H05K 1/08* (2006.01)

(52) U.S. Cl. ...................... 361/788; 174/250; 174/255; 174/261

(58) Field of Classification Search ................ 361/788, 361/796; 174/250, 255, 261, 262
See application file for complete search history.

(56) References Cited

U.S. PATENT DOCUMENTS

| 5,428,535 | A | * | 6/1995 | Katsumata et al. ............ 701/36 |
| 6,038,138 | A | * | 3/2000 | Dayton et al. ............... 361/796 |
| 6,181,563 | B1 | | 1/2001 | Shimbo et al. |
| 6,253,266 | B1 | * | 6/2001 | Ohanian ..................... 710/301 |

FOREIGN PATENT DOCUMENTS

| JP | 05-099705 | * | 4/1993 |
| JP | 08-018258 | * | 1/1996 |

OTHER PUBLICATIONS

Patent Abstracts of Japan, 2001-145233, (2001), M. Takahashi et al., "On-Vehicle ECU," Abstract only.

(Continued)

*Primary Examiner*—Kamand Cuneo
*Assistant Examiner*—Yuriy Semenenko
(74) *Attorney, Agent, or Firm*—Foley & Lardner LLP

(57) ABSTRACT

Module substrates each having the functions of input, power supply, and output/communication corresponding to the required model are attached to a base substrate having shared bus wiring. Thus, a main CPU of an input module can discriminate the respective module substrates to perform the control operation corresponding to the model, thereby sharing the module substrates among different models.

16 Claims, 16 Drawing Sheets

OTHER PUBLICATIONS

Patent Abstracts of Japan, 2000-151151 (2000), T. Nakano et al., "Electric Substrate System of Camera," Abstract only.

Patent Abstracts of Japan, 08-018258 (1996), T. Okawara., "Preventing Method for Insertion Error for Printed Board," Abstract only.

Patent Abstracts of Japan, 05-099705 (1993), E. Takagi., "Recorder," Abstract only.

Patent Abstracts of Japan, 02-021305 (1990), M. Fujiki et al., "Electronic Equipment for Control," Abstract only.

* cited by examiner

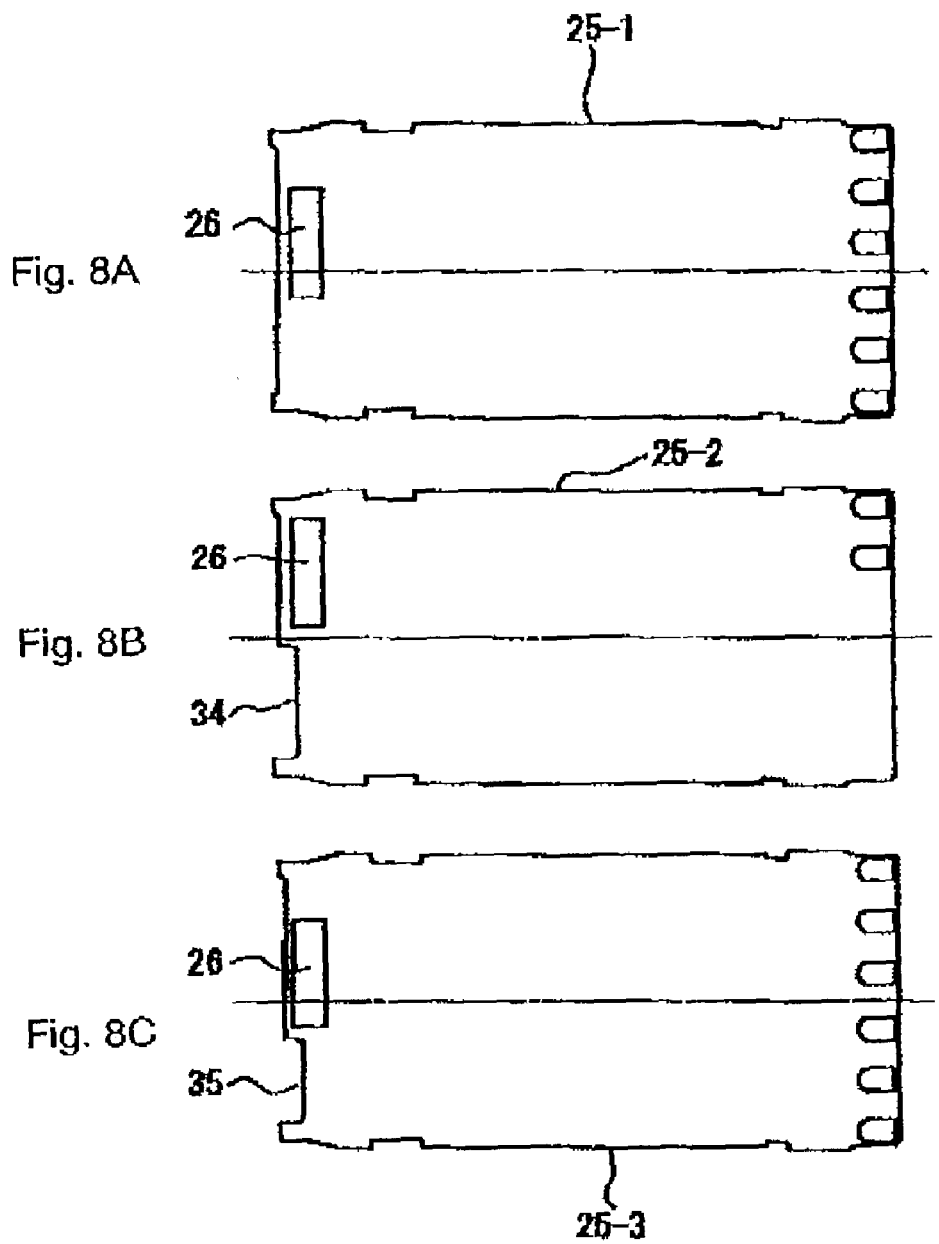

ELECTRONIC COMPONENT AND THE METHOD OF USING IT

BACKGROUND OF THE INVENTION

1. Field of the Invention

The present invention relates to an electronic device equipped with a plurality of substrates and a method for using the same and, more specifically, to an electronic device such as a temperature regulator for performing temperature regulation or a digital panel meter for measuring various types of inputs, and a method for using the same.

2. Description of the Related Art

Electronic devices equipped with a plurality of substrates include various models. For example, temperature regulators range from a low-end model for simple temperature regulation to a high-end model for precise temperature regulation. Each model is further divided into a plurality of models different in specification such as output form like relay output or transistor output, or input/output points.

Temperature regulators are designed individually according to their functions and specifications, and the circuit substrates to be placed thereon are different in type and number.

When different models of temperature regulators require different circuit substrates in terms of type and number, in order to cope with the various models of electronic devices, various kinds of circuit substrates must be designed, fabricated, or controlled (hereinafter, referred to as fabrication and the like). The fabrication and the like of these various kinds of circuit substrates increase the cost of temperature regulators.

SUMMARY OF THE INVENTION

An object of the present invention is to make circuit substrates sharable among different models of electronic devices.

According to an aspect of the present invention, an electronic device is equipped with a plurality of substrates, and includes: a base substrate which has a connection part and shared wiring connected to the connection part; an attaching substrate which has a special circuit in accordance with a function thereof and which is attached to the connection part so as to connect the special circuit with the shared wiring; and a control circuit which is mounted on either the base substrate or the attaching substrate, and which is connected to the shared wiring, wherein the control circuit discriminates the attaching substrate attached to the connection part of the base substrate, thereby making the electronic device operate as a required model out of a plurality of models.

In this case, a "connection part" is a member for connecting the base substrate with an attaching substrate to be attached and, for example, is formed of a connector to connect the shared wiring of the base substrate with a special circuit of the attaching substrate to be attached.

The "shared wiring" indicates wiring to be shared and, for example, wiring shared among a plurality of attaching substrates or a plurality of models.

The "functions" indicate not only function such as input, output, power supply, or communication, but also function such as analog input or digital input, and further indicate output form such as relay output or transistor output or input/output points. The "special circuit" indicates a circuit in accordance with such a function, like an input circuit, an output circuit, or a power-supply circuit.

The "model" indicates a type of device, and it is not only the kind of electronic device itself such as a temperature regulator or a digital panel meter, but also the type of function such as a high-end model or a low-end model in the same kind of electronic device such as a temperature regulator. It also indicates the type such as input/output points or output form.

According to the present invention, attaching an attaching substrate provided with a special circuit according to its function to the connection part of the base substrate having the shared wiring can connect the special circuit with the shared wiring, and the control circuit mounted on either the base substrate or the attaching substrate discriminates the attaching substrate via the shared wiring so as to make the model operate as the required model. Therefore, a required model can be constructed by selecting the attaching substrate having the function in accordance with the required model and attaching it to the base substrate. Hence, among the models having the same function, the attaching substrate in accordance with the function is sharable. For example, among the models having the same relay output function, the attaching substrate for relay output is sharable.

In an embodiment of the present invention, the connection part is a connector, and the attaching substrate to be detachably attached to the connector is sharable among different models.

According to the present invention, by selecting the attaching substrate provided with a special circuit in accordance with the function required for the required model, and detachably attaching the substrate to the connector of the base substrate, the required model of electronic device can be formed.

In a preferable embodiment of the present invention, the electronic device includes a case for housing the plurality of substrates, the case is of the same size in the plurality of models, the base substrate is shared among the plurality of models, and the control circuit is mounted on the attaching substrate.

The "case being of the same size" indicates not only completely the same size, but also approximately the same size with minor difference in the shape of a terminal portion or the like.

According to the present invention, different models having the same size can share the base substrate and the attaching substrate. The control circuit for control operation, which is mounted on the attaching substrate, offers more flexibility in designing models with various functions than the control circuit which is mounted on the base substrate.

According to another embodiment of the present invention, the electronic device includes a case for housing the plurality of substrates, the plurality of models include a model having a case of a different size, and the attaching substrate has a size corresponding to the model having the smallest case.

According to the present invention, the size of the attaching substrate is made to correspond to the smallest model of the plurality of models with cases different in size. This enables the attaching substrate to be attached not only to the model with the smallest size but also to the models having larger sizes, thereby increasing the number of models which can share the attaching substrate.

In still another embodiment of the present invention, the electronic device includes an attaching substrate for input, an attaching substrate for power supply, and an attaching substrate for output which are provided with an input circuit, a power-supply circuit, and an output circuit, respectively, as the above-mentioned special circuit.

According to the present invention, by selecting an attaching substrate for input, an attaching substrate for power supply, and an attaching substrate for output having functions in accordance with the specifications of the input, power supply and output of the required model, and by attaching the selected attaching substrates to the base substrate, the required model of electronic device can be formed.

In the present invention, it is possible to attach an attaching substrate which has another special circuit for communication or for adding-in into the base substrate, or to provide a special circuit such as an input circuit or a power-supply circuit in the base substrate, thereby eliminating the corresponding attaching substrate.

In an embodiment of the present invention, the connection part of the base substrate is assigned the necessary attaching substrate to be attached in accordance with the model, and a erroneous attachment prevention part are provided for allowing the necessary attaching substrate to be attached to the connection part and preventing the other attaching substrates from being attached.

According to the present invention, the provision of the erroneous attachment prevention part makes the previously assigned necessary attaching substrate be attached to the connection part of the base substrate, without causing the other attaching substrates to be mistakenly attached.

In a preferred embodiment of the present invention, the erroneous attachment prevention part prevents the attachment of the attaching substrates other than the necessary attaching substrate by causing a side of the attaching substrates to bring into contact with an electronic component mounted on the base substrate, and allows the attachment of the necessary attaching substrate by not causing the contact.

According to the present invention, the attaching substrates are designed to have different side shapes from each other, and electronic components are properly arranged in the vicinity of the connection part of the base substrate. This prevents the attaching substrates other than the necessary attaching substrate from being attached to the connection part of the base substrate by causing the side to bring into contact with the electronic component, and allows the attachment of the necessary attaching substrate with a different side shape by not causing the contact.

According to another aspect of the present invention, an electronic device is equipped with a plurality of substrates, and includes: a base substrate which has a plurality of connectors and shared wiring connected to the connectors; a plurality of attaching substrates which have respective special circuits in accordance with functions thereof and which are detachably attached to the connectors so as to connect the special circuits with the shared wiring; and a control circuit which is mounted on either the base substrate or the attaching substrates, and which is connected to the shared wiring, wherein the control circuit discriminates the attaching substrates attached to the connectors of the base substrate, thereby making the electronic device perform temperature regulating operation as a required model out of a plurality of models.

According to the present invention, by attaching the attaching substrate having a special circuit in accordance with the function into the connector of the base substrate having shared wiring, the special circuit and the shared wiring are connected to each other, and the control circuit mounted on either the base substrate or the attaching substrate identifies the attaching substrate via the shared wiring so as to perform temperature regulating operation as the required model. Consequently, by selecting the attaching substrate provided with a special circuit in accordance with the required model, and attaching the selected substrate into the base substrate, the required model of temperature regulator can be formed. Hence, among the models having the same function, the attaching substrate in accordance with the function is sharable. For example, among different models of temperature regulators having the same relay output function, the attaching substrate for relay output is sharable.

Further, according to still another aspect of the present invention, an electronic device is equipped with a plurality of substrates, and includes: a base substrate which has a plurality of connectors and shared wiring connected to the connectors; a plurality of attaching substrates which have respective special circuits in accordance with functions thereof and which are attached to the connectors in a removable manner so as to connect the special circuits with the shared wiring; and a control circuit which is mounted on either the base substrate or the attaching substrates, and which is connected to the shared wiring, wherein the control circuit discriminates the attaching substrates attached to the connectors of the base substrate, thereby making the electronic device perform measurement processing operation as a required model out of a plurality of models.

According to the present invention, by attaching the attaching substrate having a special circuit in accordance with the function into the connector of the base substrate having shared wiring, the special circuit and the shared wiring are connected to each other, and the control circuit mounted on either the base substrate or the attaching substrate discriminates the attaching substrate via the shared wiring so as to perform measurement processing operation as the required model. Consequently, by selecting the attaching substrate provided with a special circuit in accordance with the required model, and attaching the selected substrate into the base substrate, the required model of measuring device can be constructed. Hence, among the models having the same function, the attaching substrate in accordance with the function is sharable. For example, among different models of measuring devices having the same relay output function, the attaching substrate for relay output is sharable.

In an embodiment of the present invention, the electronic device further includes a case for housing the plurality of substrates, the base substrate is housed in the case along a front surface of the case and is provided with an operation part and a display part, and the attaching substrates are sharable among different models.

According to the present invention, the attaching substrate necessary for the construction of a required model of temperature regulator or measuring device can be attached to the base substrate arranged along the front surface of the case equipped with an operation unit and a display unit. This enables the attaching substrate to be shared among different models of temperature regulator or measuring device.

In a preferred embodiment of the preset invention, the plurality of attaching substrates include an attaching substrate which is sharable between the model performing the temperature regulating operation and the model performing the measurement processing operation, and the control circuit which makes the model perform the temperature regulating operation and the control circuit which makes the model perform the measurement processing operation are mounted on different attaching substrates.

According to the present invention, by attaching either the attaching substrate provided with a control circuit for temperature control or the attaching substrate provided with a control circuit for temperature regulation, the electronic device can be operated as a temperature regulator or a measuring device, and the other attaching substrates can be shared between the temperature regulator and the measuring device, thereby further increasing the number of sharable attaching substrates.

In another embodiment of the present invention, the plurality of models include a mode having a different size of case, and the attaching substrates have a size corresponding to the model having the smallest case.

According to the present invention, it is possible to share the base substrate and the attaching substrate among a plurality of models having the same size. Furthermore, since the size of the attaching substrate is made to correspond to the smallest model of the plurality of models with cases different in size, it is possible to attach the attaching substrate not only to the model with the smallest size but also to the models having larger sizes, thereby increasing the number of models which can share the attaching substrate.

According to yet another aspect of the present invention, a method for using the electronic device including: a base substrate which has a connection part and shared wiring connected to the connection part; an attaching substrate which has a special circuit in accordance with a function thereof and which is attached to the connection part so as to connect the special circuit with the shared wiring; and a control circuit which is mounted on either the base substrate or the attaching substrate, and which is connected to the shared wiring; the control circuit discriminating the attaching substrate attached to the connection part of the base substrate, thereby making the electronic device operate as a required model out of a plurality of models, the method including the steps of: selecting the attaching substrate from a plurality of attaching substrates having different functions from each other; and attaching the selected attaching substrate into the connection part of the base substrate so as to use the electronic device as the required model.

According to the present invention, the attaching substrate is shared among a plurality of models, and the attaching substrate corresponding to the required model is selected and attached to the connection part, thereby using the device as the required model of the electronic device.

BRIEF DESCRIPTION OF THE DRAWINGS

FIGS. 8A to 8C illustrate module substrates;

DESCRIPTION OF THE PREFERRED EMBODIMENTS

Embodiments of the present invention will be described in detail with reference to the drawings.

First Embodiment

Figure 1A:
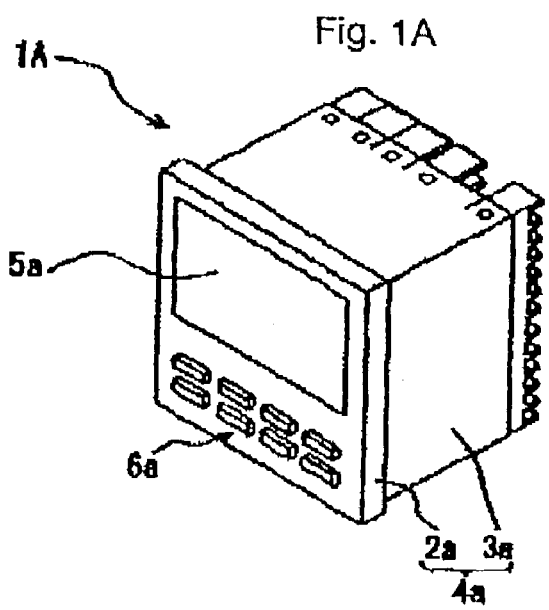
FIGS. 1A to 1C are perspective views of temperature regulators according to an embodiment of the present invention.
Figure 1B:
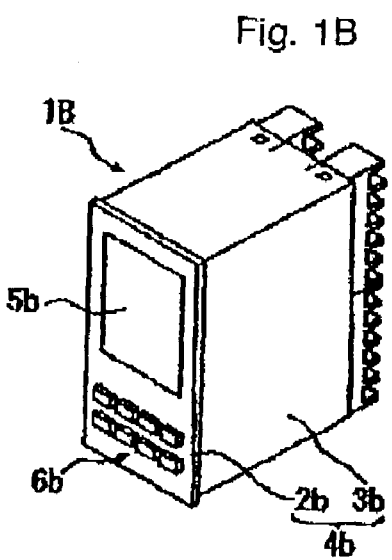
Figure 1C:
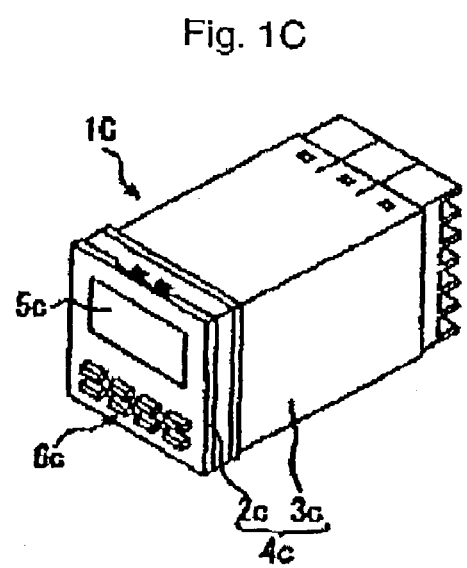

FIGS. 1A, 1B and 1C are perspective views of temperature regulators 1A, 1B, and 1C as an electronic device according to the embodiment of the present invention.

In FIG. 1A, the temperature regulator 1A has a front case 2a of which outer dimensions are 96×96 mm in accordance with DIN standards. In FIG. 1B, the temperature regulator 1B has a front case 2b of which outer dimensions are 48×96 mm in accordance with the DIN standards. In FIG. 1C, the temperature regulator 1c has a front case 2c of which outer dimensions are 48×48 mm in accordance with the DIN standards. These temperature regulators 1A to 1C are the temperature regulators according to the present invention. In the following description, for convenience of description, the temperature regulators 1A, 1B and 1C in FIGS. 1A, 1B and 1C are referred to as large-size, middle-size and small-size temperature regulators, respectively.

The large-size, middle-size and small-size temperature regulators 1A to 1C are provided with cases 4a to 4c including the front cases 2a to 2c and rear cases 3a to 3c, respectively. The cases 4a to 4c have different sizes from each other.

The front cases 2a to 2c have rectangular temperature information display units 5a to 5c, respectively, which are formed of liquid crystal and which display temperature information such as current temperature or target temperature. A plurality of operation keys 6a to 6c for setting various functions are provided below the temperature information display units 5a to 5c.

The temperature regulators 1A to 1C are so designed to house a plurality of circuit substrates, which will be described later, into the cases 4a to 4c and, basically, have the same circuit structure to share the circuit substrates.

Figure 2:
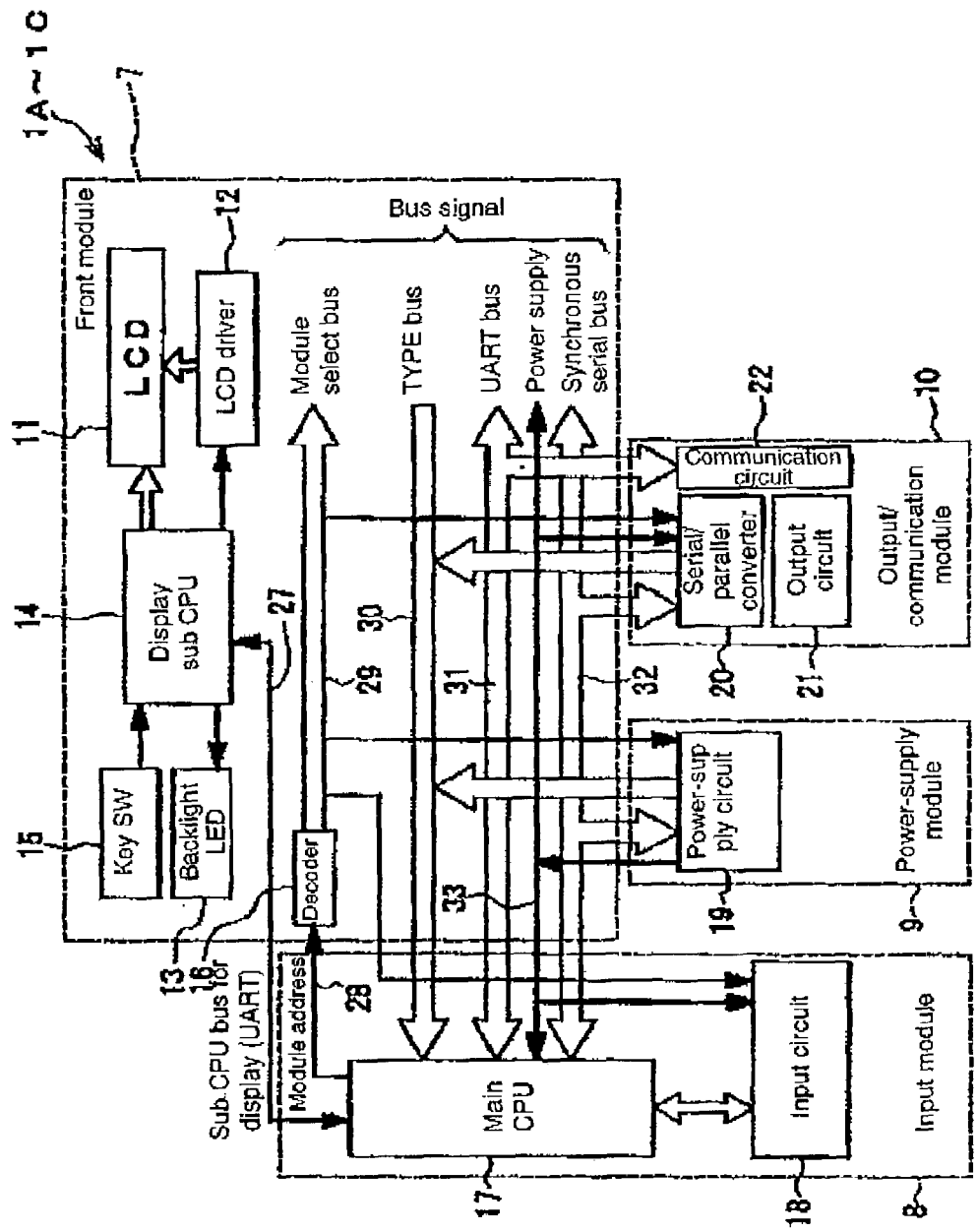
FIG. 2 is a block diagram showing the circuit structures of the temperature regulator of FIGS. 1A to 1C.

FIG. 2 is a block diagram for describing the circuit structure common to the temperature regulators 1A to 1C. This circuit structure is common to the temperature regulators 1A to 1C.

In the present embodiment, each of the temperature regulators 1A to 1C includes a front module 7, an input module 8, a power-supply module 9, and an output/communication module 10. The output/communication module 10 may be divided into an output module and a communication module.

The front module 7 is formed of a base substrate housed on the front cases 2a to 2c side, and has a particular size according to the large-size, middle-size or small-size model.

For the display in the temperature information display unit 5, the front module 7 includes a liquid crystal cell (LCD) 11, an LCD driver 12, a backlight LED 13 and a sub CPU 14 for display, and also includes a key switch 15 corresponding to the above-mentioned operation keys 6, and a decoder 16 which will be described later. The front module 7 includes shared wiring for connecting the input module 8, the power-supply module 9, and the output/communication module 10 by buses.

The input module 8 includes a main CPU 17 as a control circuit for controlling the operation of each of the temperature regulators 1A to 1C, and an input circuit 18 which receives an input from a temperature sensor which is not shown. The input module 8 is formed of a substrate for temperature regulation as an attaching substrate which is detachably attached to the base substrate forming the front module 7 via a connector. This substrate for temperature regulation is shared among the temperature regulators 1A to 1C having different specifications such as size and output form. More specifically, the main CPU 17 of the input module 8 can perform control as each of the large-size, middle-size and small-size models and, also, can perform control for different models having different specifications such as output form. The main CPU 17 discriminates the substrates forming the modules 9 and 10 which are attached to the base substrate forming the front module 7, and performs control operation as the model corresponding to these substrates.

The power-supply module 9 includes a power-supply circuit 19 to supply an AC power supply or a DC power supply to each unit, and is formed of a plurality of substrates for AC power supply and DC power supply as attaching substrates detachably attached to the base substrate via connectors. These substrates for power supply can be shared among the large-size, middle-size and small-size models, and the necessary substrates for power supply are selected according to the voltage specification and the like and are attached to the base substrate forming the front module 7.

The output/communication module 10 has a serial/parallel converter 20 and either an output circuit 21 or a communication circuit 22. This output/communication module 10 outputs various kinds of output such as relay output, current output, transistor open collector output, or BCD output or communication output such as RS-485 or RS-232C. This output/communication module 10 is formed of a plurality of substrates for output/communication, such as a relay output substrate, a current output substrate, a transistor open collector output substrate, a BCD output substrate, an RS-485 communication output substrate, or an RS-232C communication output substrate as the attaching substrates to be detachably attached to the base substrate forming the front module 7 via connectors. These substrates for output/communication can be basically shared among the large-size, middle-size and small-size models, and the necessary substrates for output/communication are selected according to the function and specification and attached to the base substrate forming the front module 7.

In this output/communication module 10, for example, the relay output substrate, the current output substrate, and the transistor open collector output substrate can be used in any of the large-size, middle-size and small-size models, whereas, for example, the RS-485 communication output substrate is used only in a model with the function of communication.

The base substrate forming the front module has the size corresponding to the front case and is used exclusively in either one of the large-size, middle-size and small-size models. This base substrate has a plurality of connectors as connection parts for detachably attaching the substrate for temperature regulation, the substrate for power supply, and the substrate for output/communication.

Figure 3A:
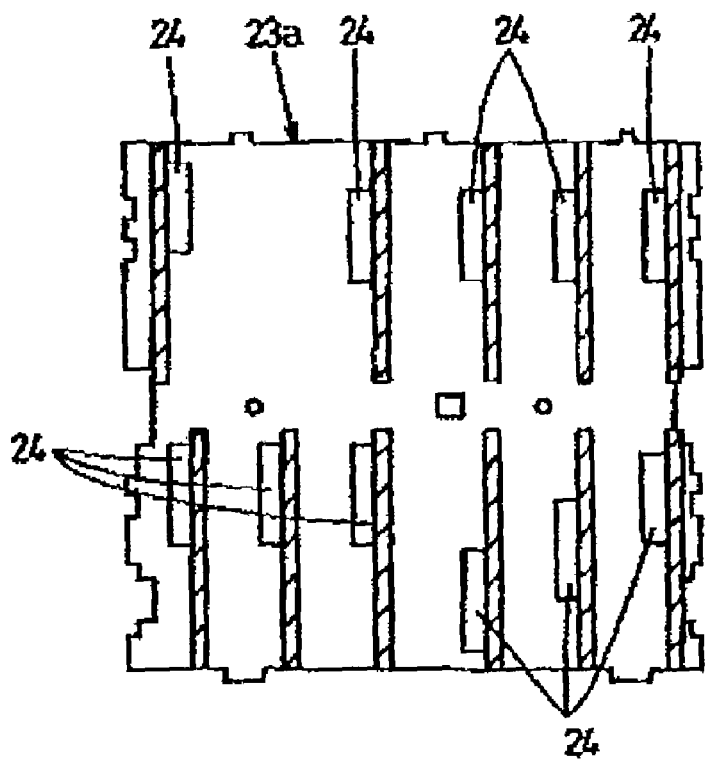
FIGS. 3A to 3C illustrate the arrangement of the connectors of the base substrates of the temperature regulators of FIGS. 1A to 1C.
Figure 3B:
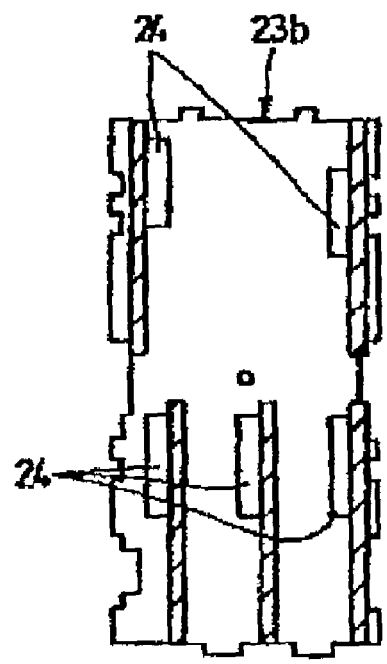
Figure 3C:
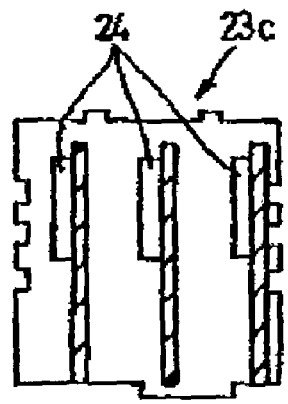

FIGS. 3A, 3B and 3C show large-size, middle-size and small-size base substrates 23a, 23b and 23c, respectively, each forming the front module 7, and also show connectors 24 in these base substrates.

The base substrate 23a of the large-size temperature regulator 1A shown in FIG. 3A has the size corresponding to the front case 2a, and is provided with 11 connectors 24 for attaching the substrates forming the modules 8, 9 and 10 (hereinafter, referred to as "module substrates"). In the diagonally shaded areas, as many as 11 module substrates can be attached.

The base substrate 23b of the middle-size temperature regulator 1B shown in FIG. 3B is provided with five connectors 24 for attaching the module substrates. In the diagonally shaded areas, as many as five module substrates can be attached.

The base substrate 23c of the small-size temperature regulator 1C shown in FIG. 3C is provided with three connectors 24 into for attaching the module substrates. In the diagonally shaded areas, as many as three module substrates can be attached.

Figure 4:
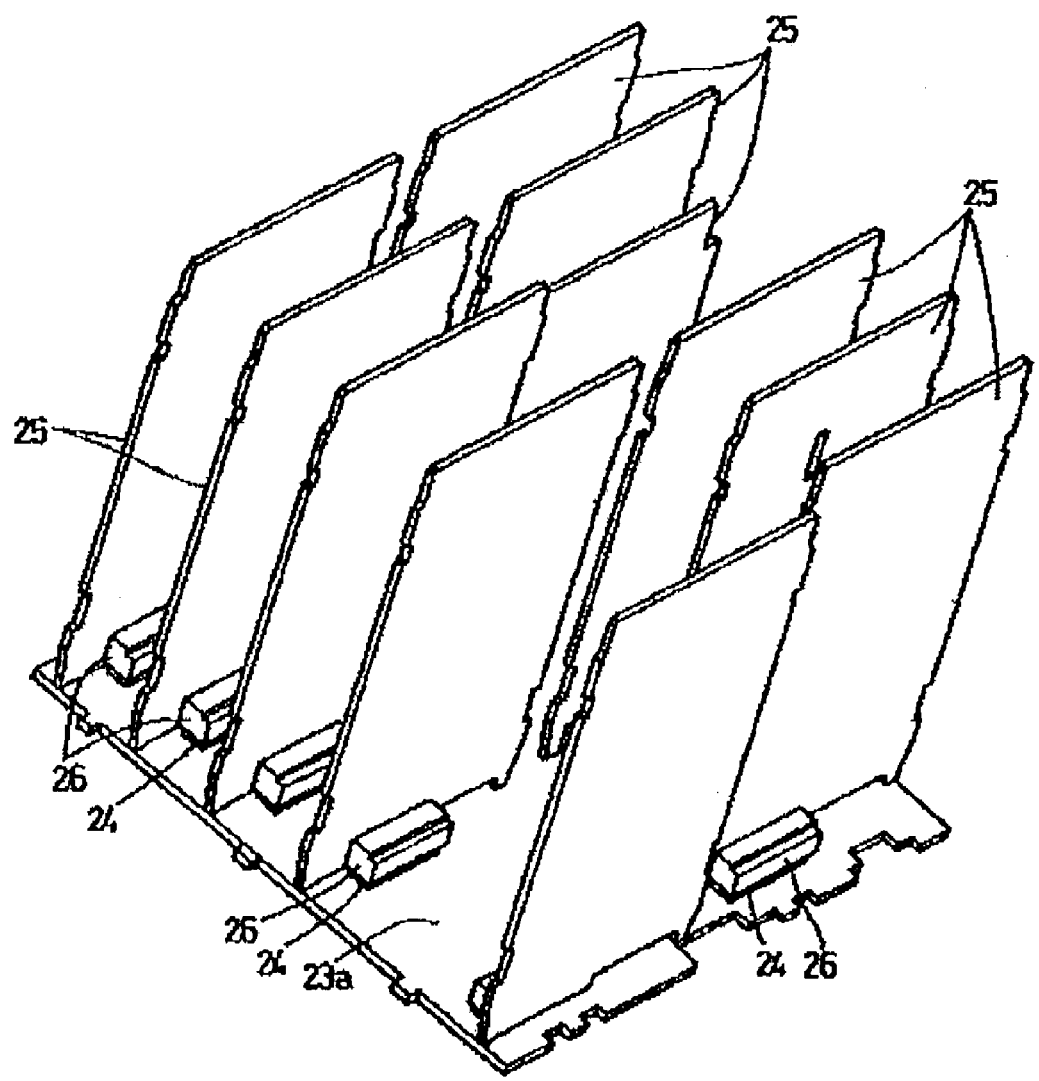
FIG. 4 is a perspective view showing the state where module substrates are attached to the base substrate.

FIG. 4 shows the large-size base substrate 23a on which 11 module substrates 25 are attached to the connectors 24 via connectors 26 on the module substrates 25 side. FIG. 4 does not illustrate the electronic components which are actually equipped with the module substrates 25, and the module substrates 25 are referred to with the same reference numeral "25"; however, these module substrate 25 are formed of a substrate for temperature regulation, a substrate for power supply, and a substrate for output/communication having different functions from each other.

As described above, the base substrates 23a to 23c each forming the front module 7 have buses as shared wiring to connect the modules 8, 9 and 10, and the bus structure in the present embodiment is as follows.

As shown in FIG. 2, the base substrates 23a to 23c each forming the front module 7 mainly include: a sub CPU bus 27 for display which is a serial bus (UART) for data communications between the main CPU 17 of the input module 8 and the sub CPU 14 for display of the front module 7; a module address bus 28 for address signals which generates module select signals in accessing the modules 8, 9 and 10; a module select bus 29 for select signals in accessing the modules 8, 9 and 10; a TYPE bus 30 which discriminates the functions and the like of the module substrates forming the modules 8, 9 and 10; an UART bus 31 for external communications; synchronous serial buses 32 for data communications with the modules 8, 9 and 10; and power supply lines 33. The power supply lines 33 are composed of different power supply lines.

In the present embodiment, all module substrates have the same substrate size so that they could be housed in the smallest temperature regulator 1C in order to share the module substrates which compose the input module 8, the power-supply module 9, and the output/communication module 10 among the large-size, middle-size, and small-size models.

Figure 5:
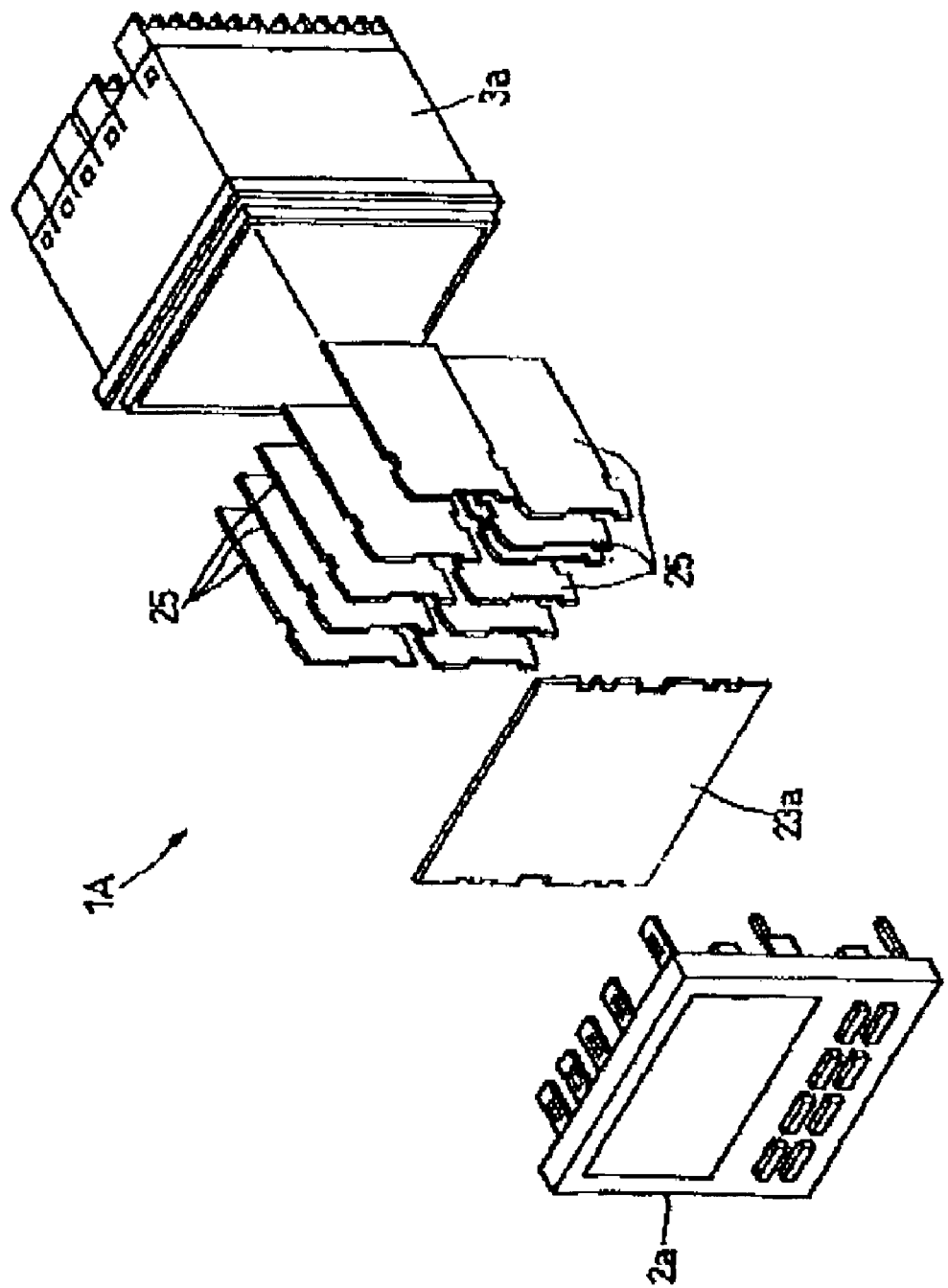
FIG. 5 is an exploded perspective view showing the structure of the circuit substrate of a temperature regulator.
Figure 6:
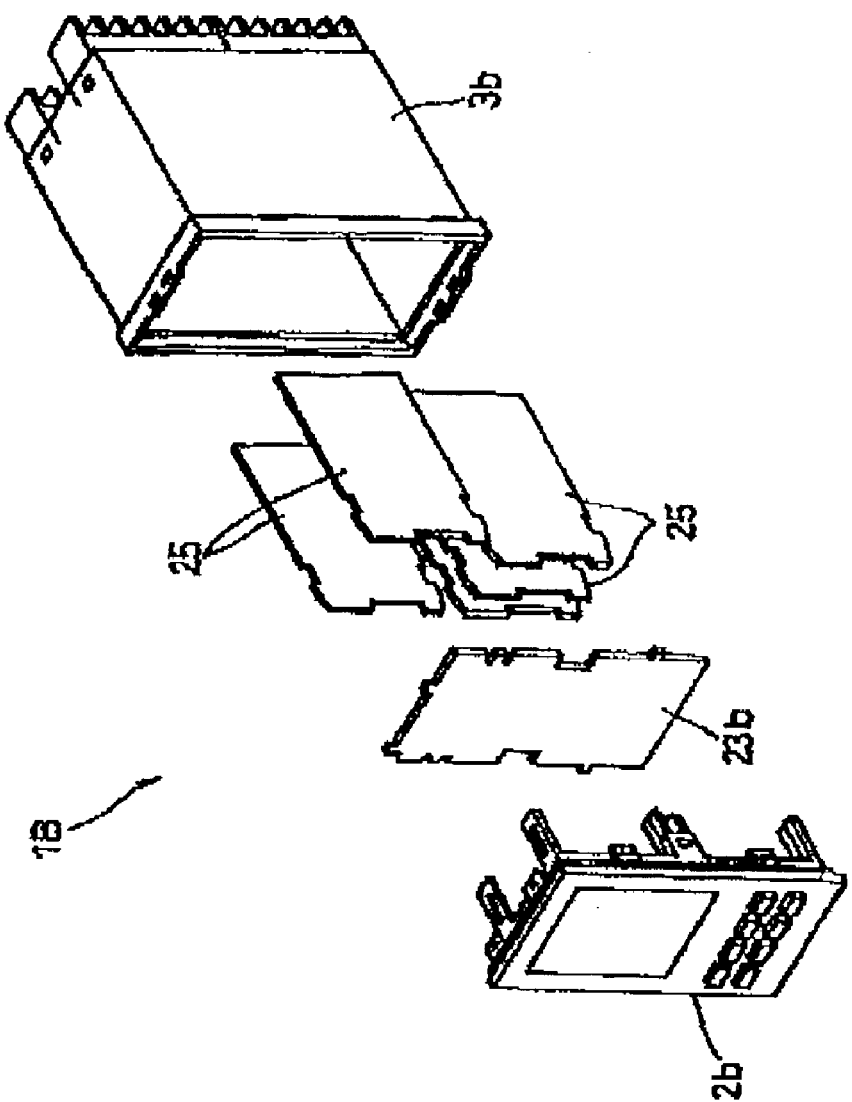
FIG. 6 is an exploded perspective view showing the structure of the circuit substrate of another temperature regulator.
Figure 7:
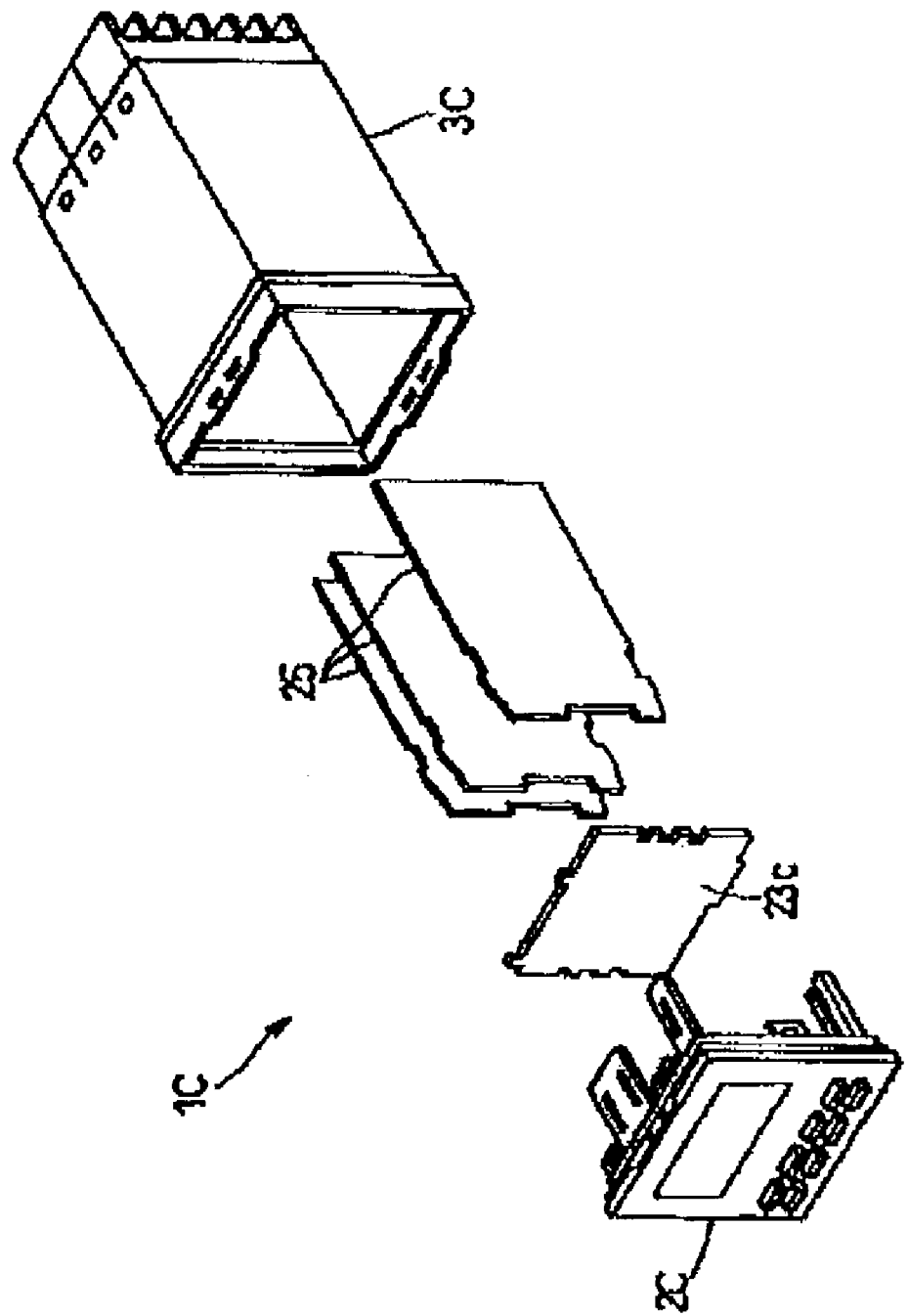
FIG. 7 is an exploded perspective view showing the structure of the circuit substrate of still another temperature regulator.

FIGS. 5 to 7 show exploded perspective views of the large-size, middle-size and small-size temperature regulators 1A to 1C, respectively, which include the base substrates 23a to 23c and the module substrates 25 to be housed in the cases 4a to 4c, respectively. In these figures, the electronic components to be mounted on the substrates are not illustrated.

The large-size temperature regulator 1A shown in FIG. 5 shows an example where 11 module substrates 25 are attached to the base substrate 23a which forms the front module 7.

These module substrates 25 include a substrate for temperature regulation which forms the input module 8, a substrate for power supply which forms the power-supply module 9, and substrates for output/communication which form the output/communication module 10.

The middle-size temperature regulator 1B shown in FIG. 6 shows an example where five module substrates 25 are attached to the base substrate 23b which forms the front module 7.

These module substrates 25 include a substrate for temperature regulation which forms the input module 8, a substrate for power supply which forms the power-supply module 9, and substrates for output/communication which form the output/communication module 10.

The small-size temperature regulator 1C shown in FIG. 7 shows an example where three module substrates 25 are attached to the base substrate 23c which forms the front module 7.

These module substrates 25 include a substrate for temperature regulation which forms the input module 8, a substrate for power supply which forms the power-supply module 9, and a substrate for output/communication which forms the output/communication module 10. These three substrates corresponding to the modules 8, 9 and 10 are fundamental.

FIGS. 5 and 6 merely show examples of the structure of the circuit substrates, and in each of the large-size and middle-size models, the number and type of the module substrates 25 to be attached to the base substrates 23a and 23b are selected in accordance with specification such as input/output points or output form.

In the present embodiment, the connectors 24 in the base substrates 23a to 23c are assigned to either one of the modules 8, 9 and 10. For example, the module substrate 25 of the input module 8 cannot be attached to the connector 24 assigned to the module substrate of the power-supply module 9 by the following structure.

In the present embodiment, the module substrates 25 are designed to have the same size which can be housed in the small-size temperature regulator 1C as mentioned above, while the module substrates 25 are designed to have three different shapes in the side end of the side having the connectors 26 to be engaged with the connector 24 of the base substrates 23a to 23c as shown in FIG. 8.

A first module substrate 25-1 shown in FIG. 8A has an almost straight side which is the side having the connector 26; a second module substrate 25-2 shown in FIG. 8B has a cut portion 34 across half the length of the side having the connector 26; and a third module substrate 25-3 shown in FIG. 8C has a cut portion 35 with a shorter width than the cut portion 34 of the second module substrate 25-2. The first and third module substrates 25-1 and 25-3 place the connector 26 in the same position in the width direction of the side (vertical direction in the figure), and the second module substrate places the connector 26 in a different position.

The electronic components mounted in the vicinity of the connectors 24 of the base substrates 23a to 23c are arranged in the necessary positions.

Figure 9A:
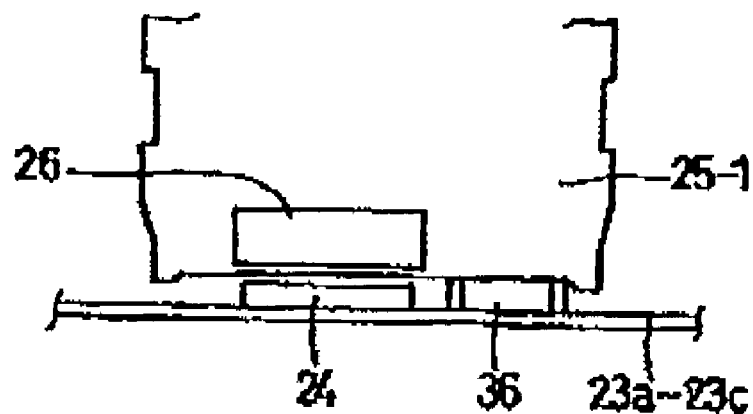
FIGS. 9A and 9B are illustrations for describing the prevention of erroneous attachment of the module substrate.
Figure 9B:
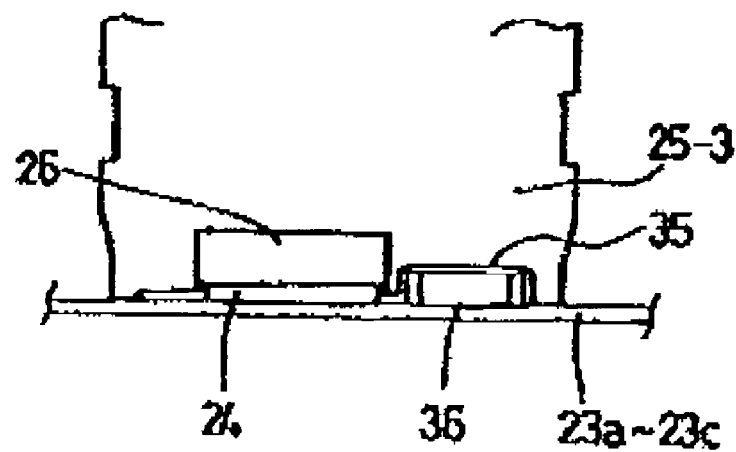

As a result, as shown in FIG. 9A, if the first module substrate 25-1 that is not assigned is tried to attach to the connector 24 of the base substrates 23a to 23c, the electronic component 36 mounted in the vicinity of the connector 24 of the base substrates 23a to 23c prevents the engagement of the connectors 24, 26 by bringing into contact with the side of the module substrate 25-1. As shown in FIG. 9B, if the third module substrate 25-3 that is assigned is tried to be attach to the connector 24 of the base substrates 23a to 23c, the cut portion 35 of the module substrate 25-3 prevents the module substrate 25-3 from bringing into contact with the electronic component 36 mounted in the vicinity of the connector 24 of the base substrates 23a to 23c, thereby allowing the connectors 24 and 26 to be engaged with each other.

As described above, misplacement of module substrates is prevented by combining the arrangement of electronic components in the vicinity of the connectors 24 of the base substrates 23a to 23c, the shapes of the sides of the module substrates 25 and the arrangement of the connectors 26 in the module substrate 25 in such a manner that the previously assigned module substrate 25 can be attached to the connector 24 of the base substrates 23a to 23c, but the non-assigned module substrates 25 cannot be attached. It is possible to prevent misplacement of module substrates by using different types of connectors having different numbers of pins from each other as the connectors 24 of the base substrates 23a to 23c and the connectors 26 of the module substrates 25, and by assigning the module substrates 25 more minutely to the base substrates 23a to 23c.

Figure 10:
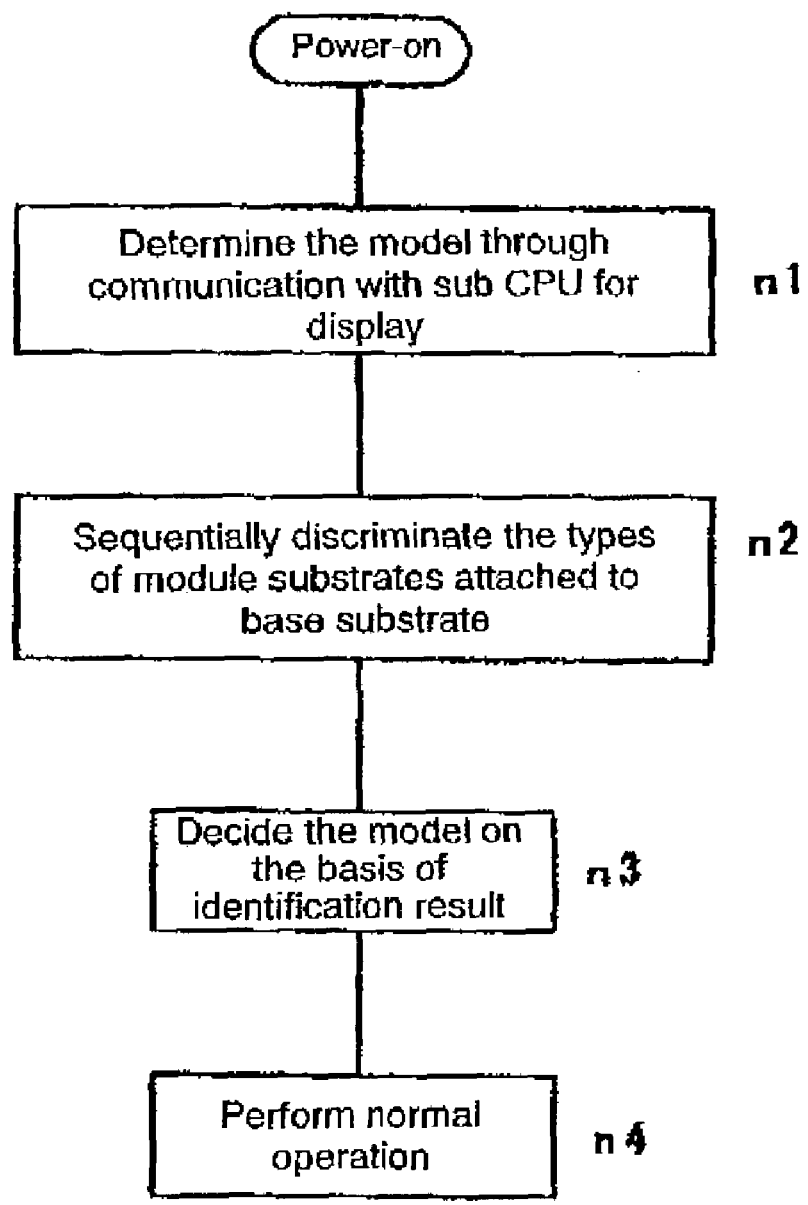
FIG. 10 is a flowchart for describing the operation of the temperature regulator.

The flowchart shown in FIG. 10 describes the control operation of the main CPU 17 of the temperature regulators 1A to 1C where a plurality of module substrates 25 forming the input module 8, the power-supply module 9, and the output/communication module 10 are attached to the base substrates 23a to 23c.

When power is turned on, the main CPU 17 of the input module 8 asks by serial communication the sub CPU 14 for display in the base substrates 23a to 23c each forming the front module 7 about which one of the large-size, middle-size and small-size model it is. Since the base substrates 23a to 23c are designed to correspond to either one of the three different sizes, the display sub CPU 14 answers the model size. By the response from the display sub CPU 14, the main CPU 17 determines the model size (step n1).

Next, the kinds of the module substrates 25 attached the connectors 24 of the base substrates 23a to 23c, that is, the functions that the module substrates 25 attached as the power-supply module 9 and the output/communication module 10 have are read in turn and discriminate the kinds (step n2). The discrimination of the kinds of the module substrates 25 is performed as will be described later by using the above-mentioned module select bus 29 and the type bus 30.

Consequently, the main CPU 17 can determine which of the large-size, middle-size or small-size it is, and which specification including output form and input/output points it has, thereby deciding the model (step n3), and moving to a normal operation for the control operation in accordance with the model (step n4).

Figure 11:
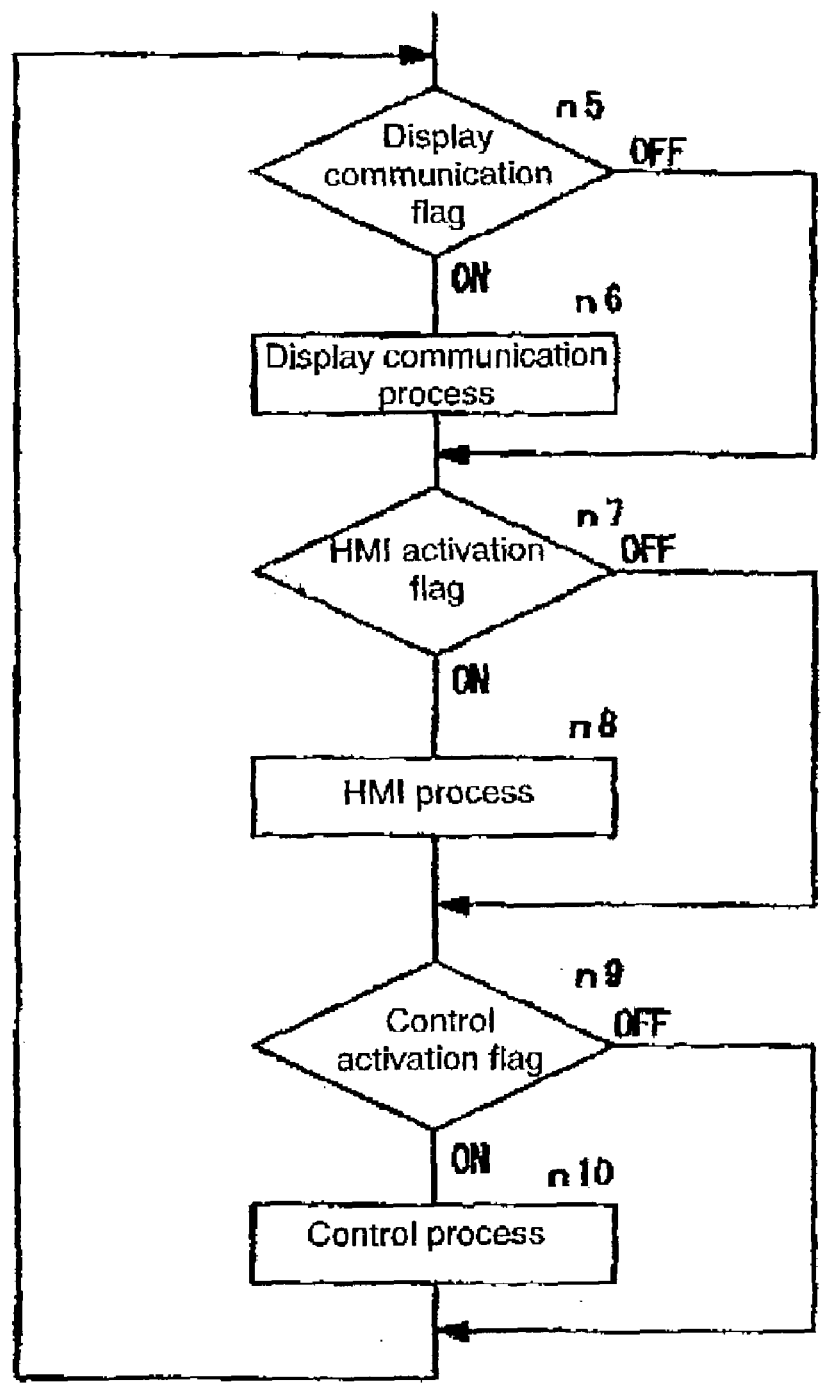
FIG. 11 is a flowchart for describing the operation of another temperature regulator.

FIG. 11 is a flowchart for describing the normal operation.

In this normal operation, it is determined whether the display communication flag indicative of a request for display process or communication process is on or not (step n5); when it is on, the display communication process is carried out (step n6); it is determined whether an HMI (Human Machine Interface) activation flag indicating whether there is a key operation and it is necessary to carry out the corresponding process (step n7); and when it is on, the HMI process corresponding to the key operation is carried out (step n8). Then, it is determined whether the control activation flag indicating whether the control process is necessary or not is on or not (step n9), and when it is on, a temperature regulation process is performed to return to step n5 (step n10).

The discrimination of the module substrates 25 attached to the base substrates 23a to 23c will be described as follows, with reference to FIGS. 12 and 13.

Figure 12:
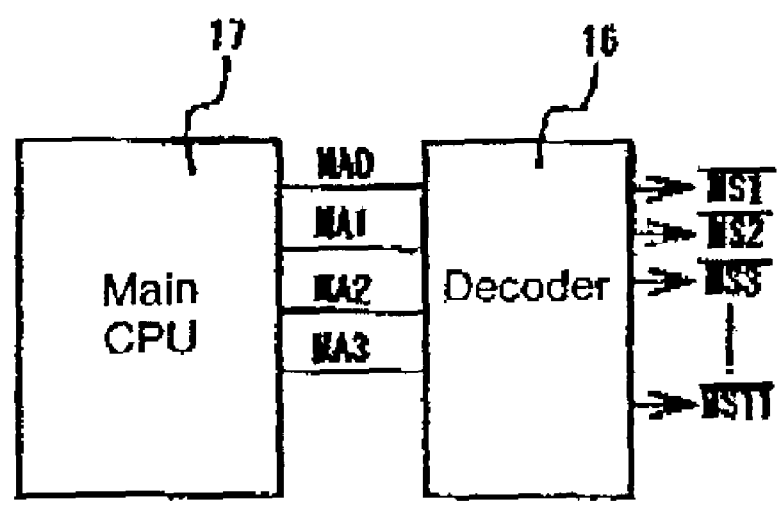
FIG. 12 is an illustration showing the generation of a module select signal for discriminating the module substrates.
Figure 13:
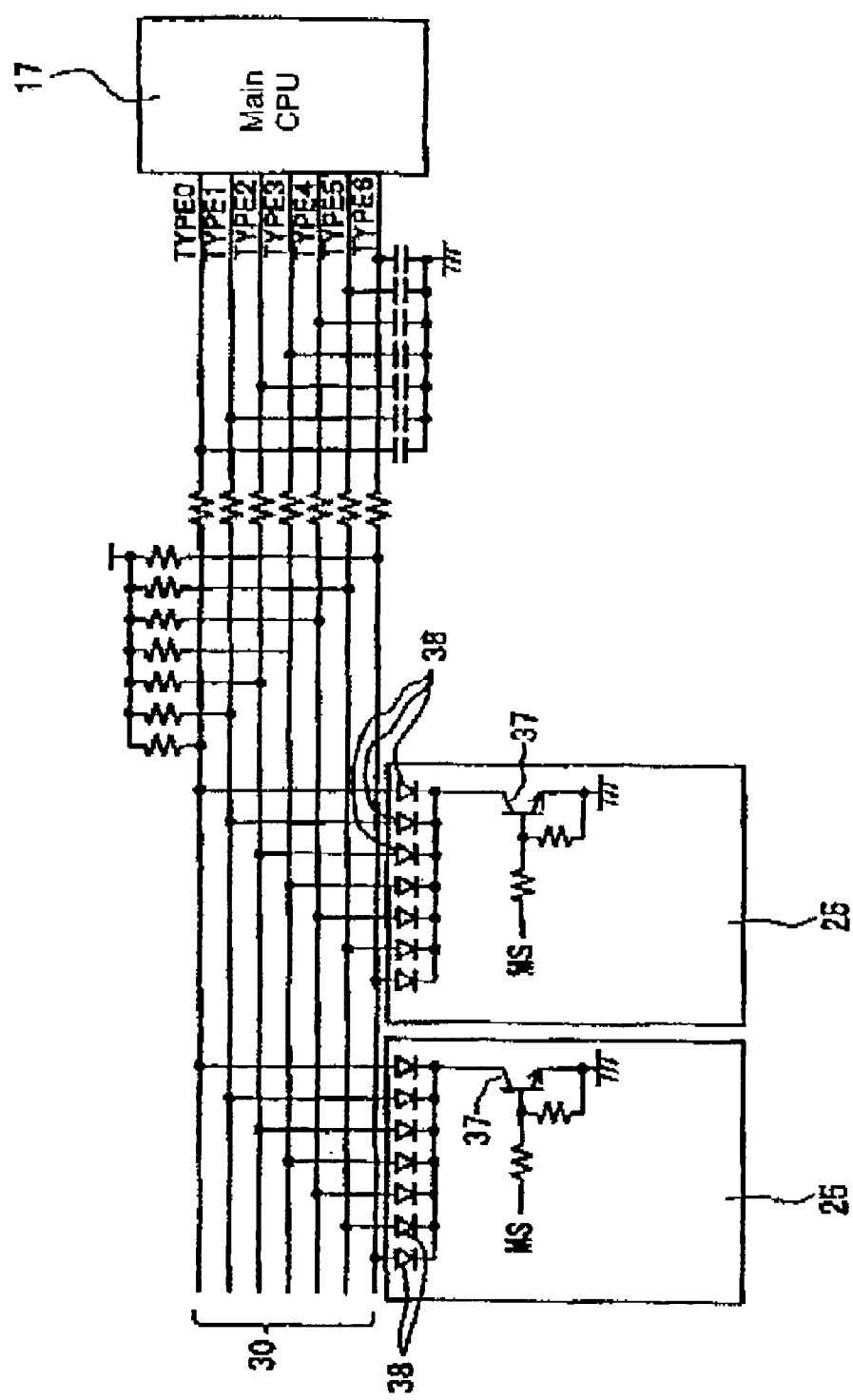
FIG. 13 is an illustration showing the generation of a type signal for discriminating the module substrates.

First, the main CPU 17, as shown in FIG. 12, outputs 4-bit module address signals MA0 to MA3 to sequentially designate 11 connectors 24 at the maximum of the base substrate 23a to the decoder 16 shown in FIG. 2 of the base substrates 23a to 23c. The decoder 16 decodes the module address signals, and outputs reverse MS signals to designate any module corresponding to the 11 connectors 24. The further reversed MS signals turn on the transistors 37 of the corresponding module substrates 25 as shown in FIG. 13. Each module substrate 25 has a plurality of diodes 38 which are made conductive when the transistor 37 is turned on, and the number of the diodes 38 corresponds to the type of the module substrate 25.

Therefore, type signals TYPE0 to TYPE6 corresponding to the number of the diodes 38 of the module substrate 25 attached to the designated connector 24 are given to the main CPU 17 via the type bus 30, which makes the main CPU bus 17 identify the type of the module substrate 25 attached to the designated connector 24.

In this manner, the module substrates are discriminated to decide the model, thereby performing the corresponding control operation.

As described above, since the module substrates forming the input module, the power-supply module, and the output/communication module are shared among the large-size, middle-size and small-size temperature regulators 1A to 1C, as compared with the conventional example in which the module substrates are separately designed for each model, it becomes possible to reduce the cost by lowing the design cost, simplifying the assembly, and increasing the number of the same substrates to be mass-produced.

Second Embodiment

Figure 14:
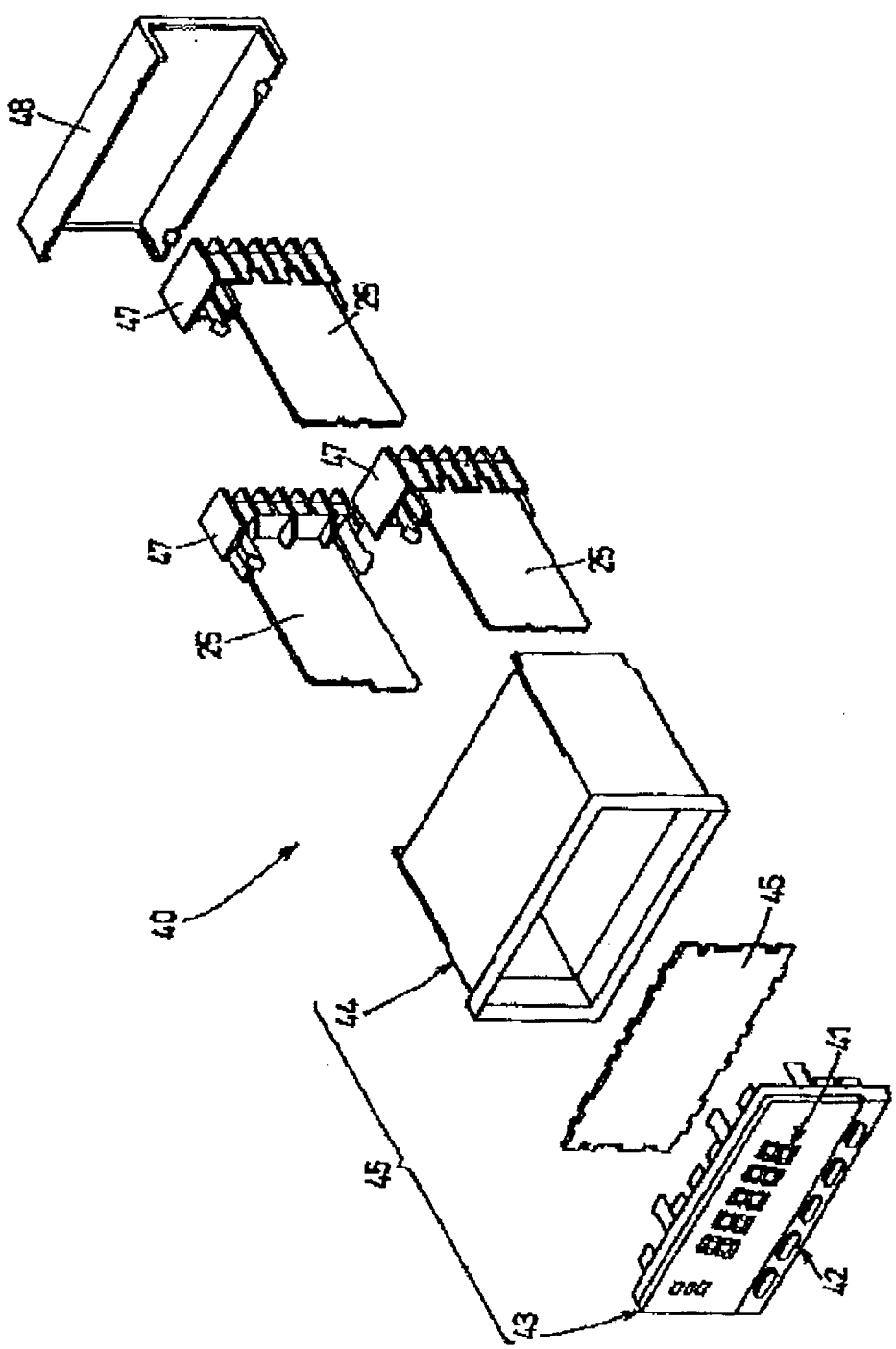
FIG. 14 is an exploded perspective view showing the structure of the circuit substrate of a digital panel meter.

FIG. 14 is an exploded perspective view of a digital panel mater as an electronic device according to another embodiment of the present invention.

The digital panel meter 40 includes a case 45 formed of a front case 43 equipped with a display unit 41 for displaying a measurement value and the like and a plurality of operation keys 42, and a rear case 44. The case 45 houses a base substrate 46 and in this case three module substrates 25. Each module substrate 25 is provided with terminal stands 47 and a terminal cover 48 which covers the terminal stands 47.

Figure 15:
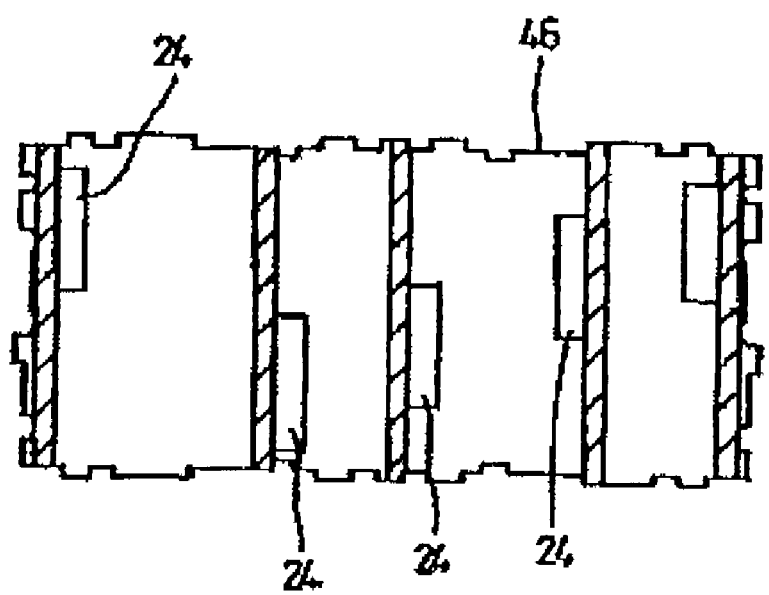
FIG. 15 is an illustration showing the arrangement of the connectors in the base substrate of the digital panel meter of FIG. 14.

The base substrate 46 has a size specially designed for the digital panel meter 40, and includes five connectors 24 for attaching the module substrate 25 as shown in FIG. 15. In the diagonally shaded areas, five module substrates 25 at the maximum can be attached.

The base substrate 46 forms the front module 7 shown in FIG. 2 similar to the base substrates 23a to 23c of the above-mentioned temperature regulators 1A to 1C, and is provided with shared wiring such as the sub CPU 14 for display and the synchronizing serial buses 32.

In the present embodiment, the software for display of the digital panel meter 40 is made the same as the software for display of the temperature regulators 1A to 1C, and the main CPU of the input module 8 discriminates between different models such as between a temperature regulator and a digital panel meter as described above, and displays only the HMI necessary for the model. This eliminates the need for the formation of the software for display individually for the temperature regulator and the digital panel meter, thereby reducing the cost. Since the main CPU discriminates between different models such as between a temperature regulator and a digital panel meter, and displays only the items (parameters) necessary for the model, without displaying unnecessary items, there is no increase in the number of set items to be displayed even when the software for display is shared among different models. This can facilitate the setting operation, and prevent setting mistakes.

The module substrates 25 attached to the base substrate 46 form the input module 8, the power-supply module 9 and the output/communication module 10 shown in FIG. 2, and the power-supply module 9 and the output/communication module 10 are so designed to be able to share the module substrates of the temperature regulators 1A to 1C.

The input module 8 includes a main CPU which controls the operation of each model of digital panel meter and an input circuit which is supplied with inputs from various sensors which are not shown, and is formed of a substrate for measurement process which is detachably attached to the base substrate 46 via connectors. This substrate for measurement process performs a measurement process as a digital panel meter, unlike the above-mentioned substrate for temperature regulation which performs a temperature regulation process.

FIG. 14 shows an example where three module substrates 25 are attached to the base substrate 46; however, the number and the type of the module substrates 25 to be attached to the base substrate are properly selected in accordance with specification such as input/output points or output form.

Figure 16:
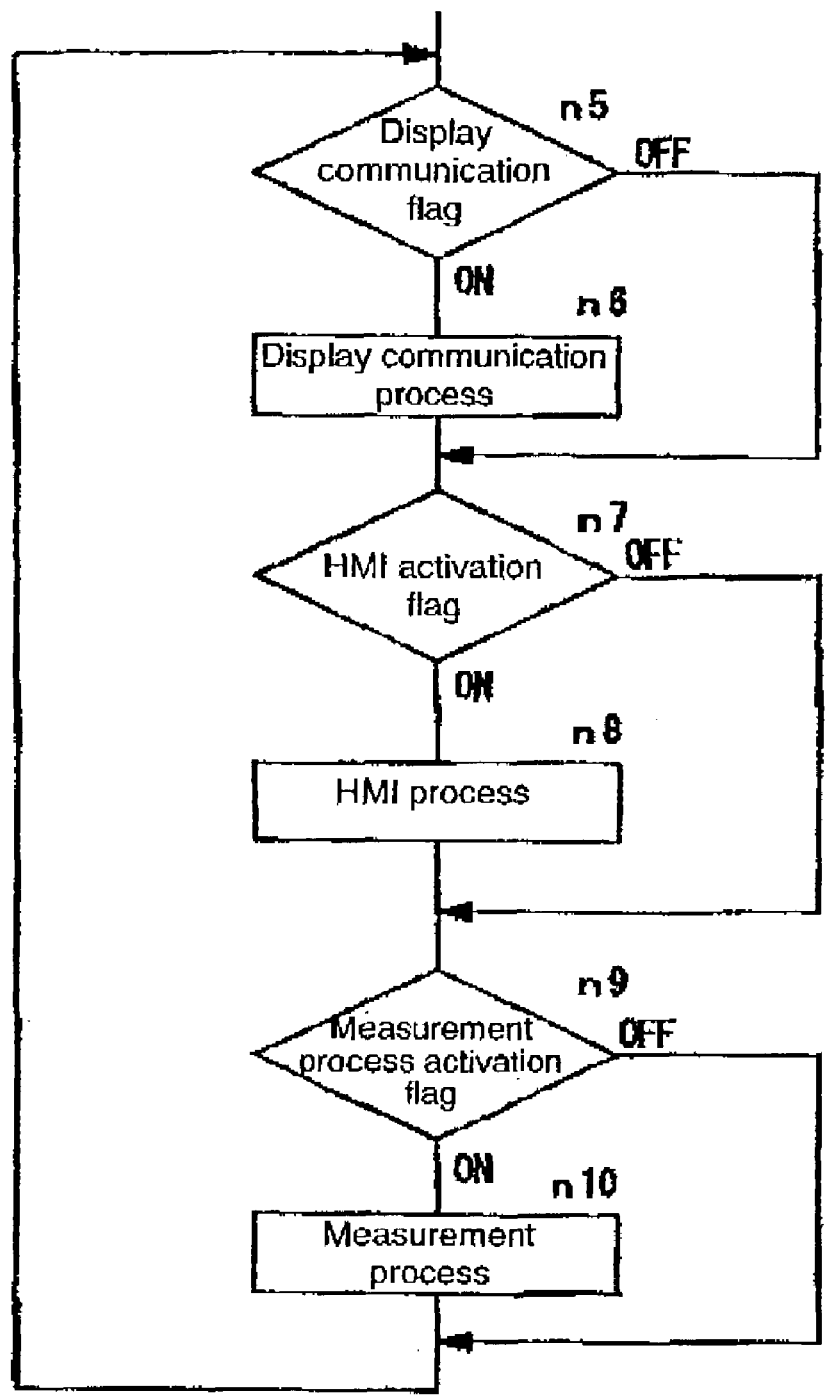
FIG. 16 is a flowchart for describing an operation.

FIG. 16 is a flowchart for describing the normal operation of this digital panel meter 40.

This normal operation is basically the same as the case of the temperature regulator of FIG. 11 except that a measurement process is carried out in place of a temperature regulation process. This digital panel meter 40, in the same manner as the conventional digital panel meters, displays measurement values and the like, and also provides an alarm output based on the results of comparison with the previously set comparison values.

According to the present embodiment, not only the temperature regulators 1A to 1C, but also the digital panel meter 40 can share the power-supply and output/communication module substrates, thereby realizing further cost reduction in design, fabrication and control of these models.

Others

In the aforementioned embodiments, the main CPU as a control circuit is installed in the input module; however, in another embodiment of the present invention the main CPU may be installed in the front module or another module.

In another embodiment of the present invention, an additional module substrate with an optional function may be attached.

In the aforementioned embodiments, the module substrates consisting of the input module 8, the power supply module 9 and the output/communication module 10 are attached to the base substrate forming the front module 7; however, in another embodiment of the present invention, the functions of any of the modules 8, 9 and 10 may be integrated into the base substrate 7 to omit the corresponding attaching substrate. The present invention can include an attaching substrate which may not be shared by the other models or may include another substrate.

Although the aforementioned embodiments describe the present invention as temperature regulators and a digital panel meter, the present invention can be applied to other electronic devices such as counters, timers and display devices.

In the aforementioned embodiments, the base substrate is arranged along the front surface of the case; however, it can be arranged in a position other than the front surface.

In the aforementioned embodiments, the attaching substrates are attached to the connection parts provided in the base substrate; however, in another embodiment of the present invention, the connection parts can be provided, for example, in the substrate for connection instead of the base substrate and the shared wiring of the base substrate and the wiring of the attaching substrates can be connected via the substrate for connection.

As described above, according to the present invention, the required model can be constructed by selecting the attaching substrate provided with the function in accordance with the required model, and attaching the substrate to the base substrate. Consequently, among the models having the same function, the attaching substrate in accordance with the function is sharable, and this sharing of the substrate among different models realizes cost reduction in design, fabrication and control of these models.

What is claimed is:

1. An electronic device equipped with a plurality of substrates, comprising:
    a base substrate which has a connection part and shared wiring connected to the connection part;
    an attaching substrate which has a special circuit in accordance with a function thereof and which is attached to the connection part so as to connect the special circuit with the shared wiring, the attaching substrate sharable among different models of a plurality of models; and
    a control circuit which is mounted on either the base substrate or the attaching substrate, and which is connected to the shared wiring, wherein
    the control circuit discriminates and identifies the attaching substrate attached to the connection part of the base substrate, determines a required model out of the plurality of models based on identifying the attaching substrate, and makes the electronic device operate as the required model.

2. The electronic device according to claim 1, wherein the connection part is a connector, and
    the attaching substrate to be detachably attached to the connector is sharable among different models.

3. The electronic device according to claim 1, further comprising:
    a case for housing the plurality of substrates, wherein
    the plurality of models have the same size of case, the base substrate is shared among the plurality of models, and the control circuit is mounted on the attaching substrate.

4. The electronic device according to claim 1, further comprising:
    a case for housing the plurality of substrates, wherein
    the plurality of models include a model having a different size of case, and the attaching substrate has a size corresponding to the model having the smallest case.

5. The electronic device according to claim 1, comprising:
    an attaching substrate for input, an attaching substrate for power supply, and an attaching substrate for output which are provided with an input circuit, a power-supply circuit, and an output circuit, respectively, as the special circuit.

6. The electronic device according to claim 1, wherein
    the connection part of the base substrate is assigned a necessary attaching substrate to be attached according to the model, and
    the electronic device further comprises a erroneous attachment prevention means for allowing the necessary attaching substrate to be attached to the connection part while preventing an attaching substrate other than the necessary attaching substrate from being attached.

7. The electronic device according to claim 6, wherein
    the erroneous attachment prevention means prevents an attaching substrate other than the necessary attaching substrate from being attached by causing a side of the attaching substrate to bring into contact with an electronic component mounted on the base substrate or allows the necessary attaching substrate to be attached by not causing the contact.

8. An electronic device equipped with a plurality of substrates, comprising:
    a base substrate which has a plurality of connectors and shared wiring connected to the connectors;
    a plurality of attaching substrates which have respective special circuits in accordance with functions thereof and which are detachably attached to the connectors so as to connect the special circuits with the shared wiring, the attaching substrates sharable among different models of a plurality of models; and
    a control circuit which is mounted on either the base substrate or the attaching substrates, and which is connected to the shared wiring, wherein
    the control circuit discriminates and identifies the attaching substrates attached to the connectors of the base substrate, determines a required model out of the plurality of models based on identifying the attaching substrates, and makes the electronic device perform temperature regulating operation as the required model.

9. An electronic device equipped with a plurality of substrates, comprising:
    a base substrate which has a plurality of connectors and shared wiring connected to the connectors;
    a plurality of attaching substrates which have respective special circuits in accordance with functions thereof and which are detachably attached to the connectors so as to connect the special circuits with the shared wiring, the attaching substrate sharable among different models of a plurality of models; and
    a control circuit which is mounted on either the base substrate or the attaching substrates, and which is connected to the shared wiring, wherein
    the control circuit discriminates and identifies the attaching substrates attached to the connectors of the base substrate, determines a required model out of the plurality of models based on identifying the attaching substrate, and makes the electronic device perform measurement processing operation as the required model.

10. The electronic device according to claim 8 further comprising:
    a case for housing the plurality of substrates, wherein
    the base substrate is housed in the case along a front surface of the case and is provided with an operation part and a display part.

11. The electronic device according to claim 10, wherein the plurality of attaching substrates include an attaching substrate which is sharable between the model performing the temperature regulating operation and the model performing the measurement processing operation, and the control circuit which makes the model perform the temperature regulating operation and the control circuit which makes the model perform the measurement processing operation are mounted on different attaching substrates.

12. The electronic device according to claim 10, wherein the plurality of models include a model having a different size of case, and the attaching substrates have a size corresponding to the model having the smallest case.

13. The electronic device according to claim 10, comprising
an attaching substrate for input, an attaching substrate for power supply, and an attaching substrate for output which are provided with an input circuit, a power-supply circuit, and an output circuit, respectively, as the special circuits.

14. The electronic device according to claim 10, wherein
the connectors of the base substrate are assigned necessary attaching substrates to be attached according to the model, and
the electronic device further comprises erroneous attachment prevention means for allowing the necessary attaching substrates to be attached to the connectors while preventing attaching substrates other than the necessary attaching substrates from being attached.

15. The electronic device of claim 14, wherein
the erroneous attachment prevention means prevents the attaching substrates other than the necessary attaching substrates from being attached by causing a side of each the attaching substrates to bring into contact with an electronic component mounted on the base substrate or allows the necessary attaching substrates to be attached by not causing the contact.

16. A method for using an electronic device comprising:
a base substrate which has a connection part and shared wiring connected to the connection part; an attaching substrate which has a special circuit in accordance with a function thereof and which is attached to the connection part so as to connect the special circuit with the shared wiring, the attaching substrate shareable among different models of a plurality of models; and a control circuit which is mounted on either the base substrate or the attaching substrate, and which is connected to the shared wiring, the control circuit discriminating and identifying the attaching substrate attached to the connection part of the base substrate, determines a required model out of the plurality of models based on identifying the attaching substrate, and makes the electronic device operate as the required model, the method comprising the steps of:
selecting the attaching substrate from a plurality of attaching substrates having different functions from each other; and
attaching the selected attaching substrate to the connection part of the base substrate so as to use the electronic device as the required model.

* * * * *